United States Patent [19]
Matsuzaki et al.

[11] Patent Number: 5,228,017
[45] Date of Patent: Jul. 13, 1993

[54] OPTICAL SYSTEM DRIVE APPARATUS FOR AN OPTICAL RECORDING/REPRODUCING APPARATUS

[75] Inventors: Kunihisa Matsuzaki; Hiroyuki Kurihara, both of Yokosuka; Seiji Morino, Tsukui, all of Japan

[73] Assignee: Victor Company of Japan, Ltd., Yokohama, Japan

[21] Appl. No.: 953,185

[22] Filed: Sep. 29, 1992

Related U.S. Application Data

[63] Continuation of Ser. No. 558,431, Jul. 27, 1990, abandoned.

[30] Foreign Application Priority Data

| Jul. 28, 1989 | [JP] | Japan | 1-197140 |
| Jul. 28, 1989 | [JP] | Japan | 1-197141 |
| Dec. 18, 1989 | [JP] | Japan | 1-327527 |
| Jan. 16, 1990 | [JP] | Japan | 2-6817 |
| Jan. 18, 1990 | [JP] | Japan | 2-9353 |

[51] Int. Cl.$^5$ .............................................. G11B 7/00
[52] U.S. Cl. .............................. 369/44.15; 369/44.16
[58] Field of Search ............... 369/44.15, 44.16, 44.14, 369/112, 32, 44.11, 44.17, 58, 44.21

[56] References Cited

U.S. PATENT DOCUMENTS

| 4,571,715 | 2/1986 | Kato et al. | 369/44.16 |
| 5,001,694 | 3/1991 | Lee et al. | 369/44.16 |
| 5,023,858 | 6/1991 | Nakayama | 369/112 |

Primary Examiner—Tommy Chin
Assistant Examiner—Robert Chevalier
Attorney, Agent, or Firm—Jacobson, Price, Holman & Stern

[57] ABSTRACT

An optical system for an optical recording and/or reproducing apparatus that irradiates laser light emitted from a light-emitting diode (8) to an opto-magnetic disk (2) via a relay prism (11) and an objective lens (12) and irradiates light reflected by said opto-magnetic disk to a light-receiving diode (15 A,B), and which has a first moving portion (22) that holds the objective lens, a second moving portion (33) that holds the relay prism, a connection mechanism connecting the first moving portion and the second moving portion, a focus moving device (21) to move said first moving portion in the direction of focus, and a tracking feed moving device (27) to move the first and second moving portions in the direction of tracking feed.

3 Claims, 8 Drawing Sheets

OPTICAL SYSTEM DRIVE APPARATUS FOR AN OPTICAL RECORDING/REPRODUCING APPARATUS

This is a continuation of application Ser. No. 07/558,431, filed Jul. 27, 1990 which was abandoned upon the filing hereof.

BACKGROUND OF THE INVENTION

The present invention relates to an optical recording and/or reproducing apparatus such as optical disc apparatus, and in particular, relates to an optical system for such optical recording and reproducing apparatus.

Optical disc apparatus such as opto-magnetic disc apparatus has come to be widely used for text data file for the recording of computer data.

Generally, since the optical system for the opto-magnetical disc apparatus is complicated, the weight of the system increases. This fact results in a major problem in realizing a high speed access. As the means for solving this drawback, there is known a separation-type system such that only an objective lens of the optical system, an actuator unit for driving the lens and relay prism for directing a laser beam to the lens are mounted on a feed/or tracking mechanism, to thus construct a movable unit transferred in a radial direction of the disc, and that other portion of the optical system are fixed to the base of the recording and reproducing apparatus to thereby reduce the weight of the movable unit to much degree, thus performing a high-speed access.

In case of recording or reproducing, the disc is driven to rotate at a high speed (such as 3,600 rpm) and irradiating the light spot of the laser beam to the disc and performing the optical recording and reproducing requires that the light spot be moved in the direction of the diameter of the disc and with the range from the outer diameter to the inner diameter of the disc. In addition, when there is the vibration of the surface of the disc, the point of focus of the light spot must automatically track on the disc.

the movement of the light spot in the direction of the radius (feed operation) uses a tracking servo actuator and is performed by moving the relay prism and the objective lens. In addition, the operation so that the point of focus tracks the disc uses a focus servo actuator and is performed by moving the objective lens up and down.

These tracking servo and focus servo actions should desirably be performed at a high access speed with respect to the disc, and have improved controllability of the objective lens without causing vibration and the like. In addition, it is also desirable that the servo actuator be small and lightweight.

SUMMARY OF THE INVENTION

The present invention relates to an optical recording and reproducing apparatus such as optical disc apparatus, and in particular, relates to optical system drive apparatus for such optical recording and reproducing apparatus.

This object of the present invention can be achieved by an optical system having a first moving portion that holds an objective lens, a second moving portion that holds an relay prism, a connection means connecting the first moving portion and second moving portion, a focus moving means to move the first moving portion in the direction of focus, and a tracking feed moving means to move the first and second moving portions in the direction of tracking feed.

In addition, the optical system of the present invention has as the connection means, a first connection means that can be displaced in the direction of focus, and a second connection means that can be displaced in the direction of tracking feed.

In addition, the optical system of the present invention has as the focus moving means and the tracking feed means, a coil for both focus servo and tracking servo feed fixed to the first moving means, and a magnet fixed around the coil.

BRIEF DESCRIPTION OF THE DRAWINGS

This invention will now be described in greater detail with reference to the accompanying drawings wherein.

DETAILED DESCRIPTION OF THE PREFERRED EMBODIMENT

Figure 1:
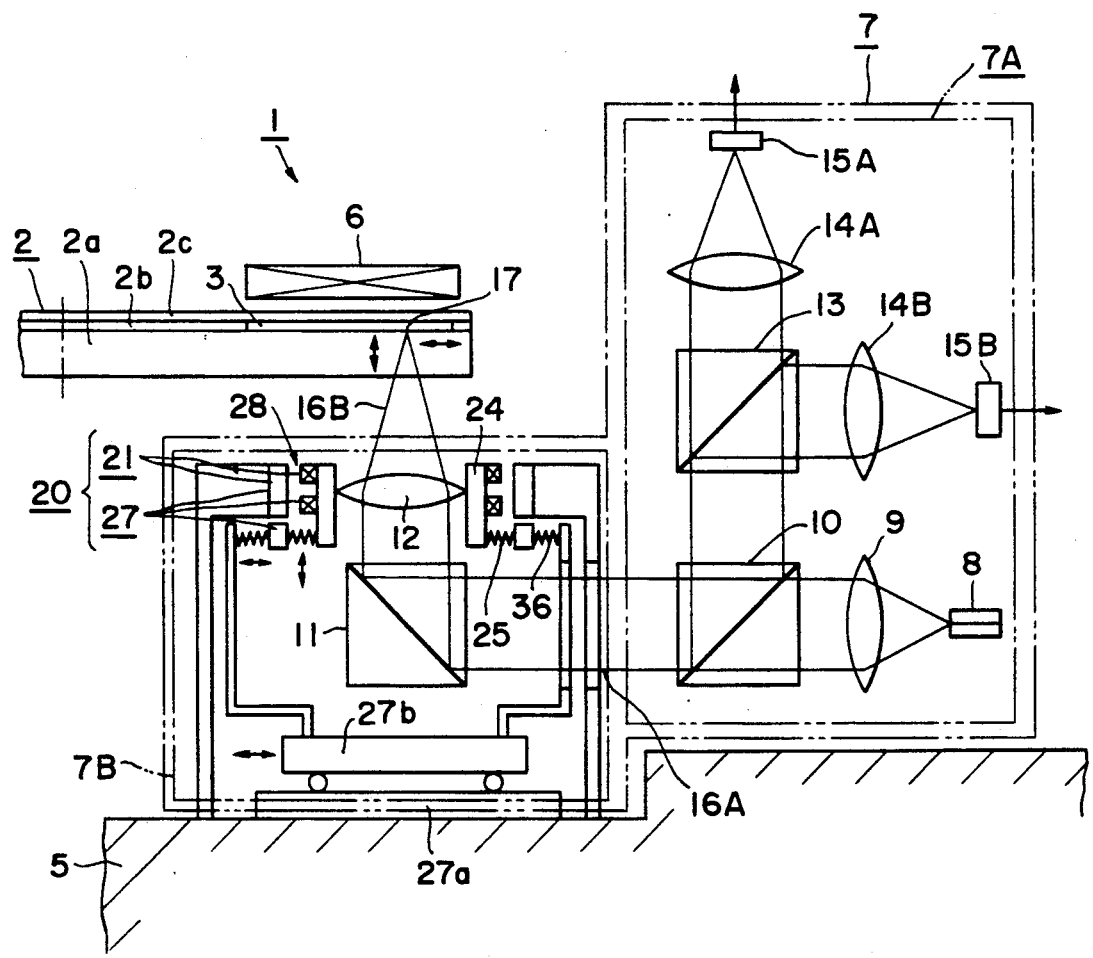
FIG. 1 is schematic view of a first embodiment of an optical recording and reproducing apparatus in accordance with the present invention.

FIG. 1 through FIG. 4 are views indicating a first embodiment of the present invention. FIG. 1 is an outline view indicating the configuration of a compact opto-magnetic disc apparatus, and an opto-magnetic disc apparatus 1 is configured from a compact opto-magnetic disc 2, an electromagnet 6, an optical unit including a focus and tracking servo actuator 20, and a base 5.

The disc 2 consisting of a transparent substrate 2a, an opto-magnetic film 26 and a protective film 2c, is rotatably driven at a speed CAV 3,600 rpm by a spindle motor (not indicated in the figure) which is fixed to the base 5. Then, an electromagnet 6 disposed via a gap, on the side of the protective film 2c, impresses a bias magnetic field in the direction vertical with respect to the opto-magnetic film 2b. In addition, laser light 16B from an optical unit 7 comprising a fixed unit 7A and movable unit 7B performs the recording and reproducing of information with respect to the opto-magnetic film 2b and from the side of substrate 2a.

The optical unit 7 is configured from a laser diode 8, a collimator lens 9, a beam splitter 10, a relay prism 11, an objective lens 12, a polarizing beam splitter 13, converging lenses 14A and 14B, and photodiodes 15A and 15B, etc.

The laser light that is emitted from this laser diode 8 is collimated into parallel beams by the collimator lens 9 and then the sectional shape of the beam is shaped into a predetermined shape by a beam shaping prism not indicated in the figures. The light beams 16A that pass the beam splitter 10 are irradiated to the relay prism 11. The laser light 16B that is reflected by this relay prism 11 is irradiated by the objective lens 12, as a minute spot 17 onto the surface of the opto-magnetic film 2b on a recording track of a recording area 3 of the disc 2.

In the status where the optical unit 7 is operating in the recording mode, this minute spot 17 that is irradiated onto the surface of this opto-magnetic film 2b, has a light intensity that is suitable for recording. Also, in the status where the optical recording and reproducing apparatus 7 is operating in the reproducing mode, the laser diode 8 is controlled by an output control apparatus (not indicated in the figure) so that it has a light intensity which is suitable for reproduction.

When there is this recording mode, the direction of vertical magnetization of the opto-magnetic film 2b on the recording track at those places scanned by the light spot 17 modulated by the recording data, is reversed by the bias magnetic field of the electromagnet 6, and the recording of data signals is therefore performed.

When there is the reproduction mode, because of the previously described opto-magnetic effect and the vertical magnetization direction of the photo-magnetic film 2b, the laser light reflected by the surface of the photo-magnetic film 2b varies in its plane of polarization, and is reflected by the beam splitter 10 and via the objective lens 12 and relay prism 11, and is irradiated via a ½-wavelength plate (not indicated in the figure) to the polarizing beam splitter 13. The laser light that passes this polarizing beam splitter 13 is converged by the convergence lens 14A and is converted into electrical signals by the photodiode 15A, and is outputted as detection signals. On the other hand, the laser light that is reflected by this polarizing beam splitter 13 is converged by the converging lens, 14B, converted into electrical signals by the photodiode 15B, and outputted as detection signals.

These electrical signals respectively vary in their amplitude in response to the variation of the plane of polarization, to the opposite direction because of the action of the polarizing beam splitter 13 and so reproduction of the data recorded on the disc is performed from the difference between both of them.

The focus and tracking servo actuator 20 is comprised of a focus servo actuator 21 and a tracking servo actuator 27, and is incorporated into the movable unit 7B.

This focus and tracking servo actuator 20 has a coil holder 24 supporting the objective lens 12, a movable base portion 27b supporting the relay prism 11, and supported so as to be slidably movable in the direction of the linear ball bearing 27a fixed to the base 5, and in addition, the coil holder 24 and the movable base portion 27b are connected by a focus servo leaf spring 25 and a tracking servo leaf spring 36. The focus servo coil 23 and the coil for tracking servo/feed coil 34 are provided with a fixed portion 28 which is a magnetic field portion fixed to the base 5 for both the tracking servo/feed, and the focus servo that form closed magnetic fields in the tracking servo/feed coil 34 and the focus servo coil 23, respectively. This tracking servo actuator 27 is such that tracking is performed by the displacement of the tracking servo spring, and so that feed operation is mainly performed by the sliding of the linear ball bearing. In this manner, the light spot 17 is movable within the range from the outer diameter to the inner diameter of the recording area 3 of the disc 2.

Figure 2:
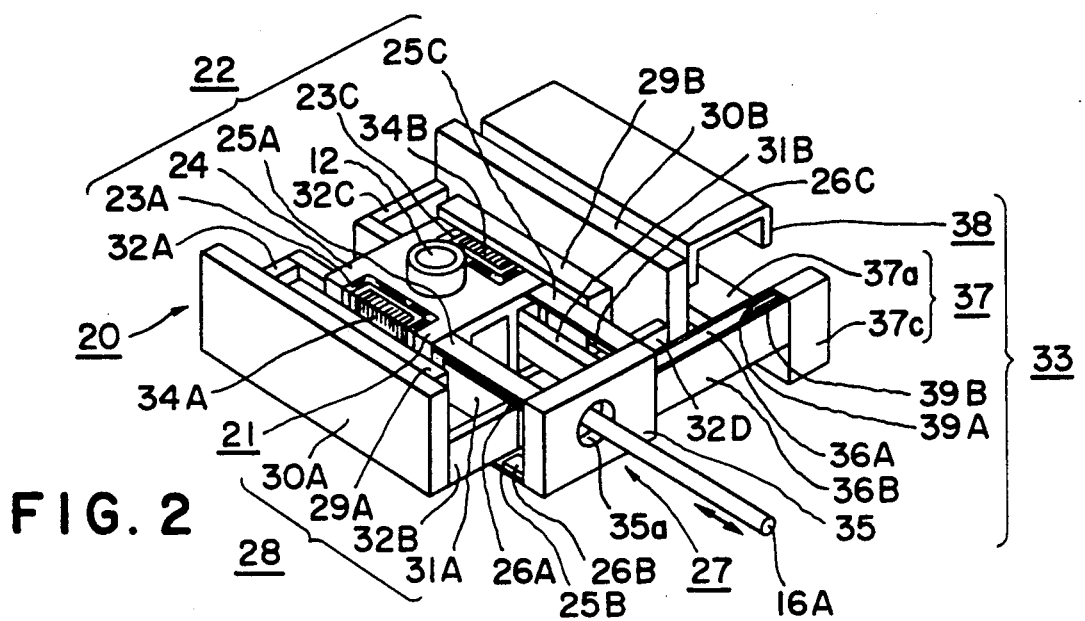
FIG. 2 is a perspective view of the optical system of FIG. 1.
Figure 3:
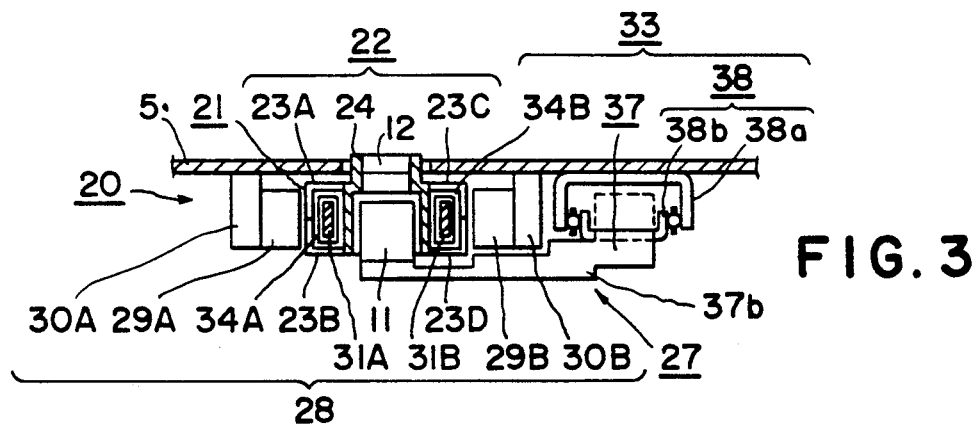
FIG. 3 is a cross-sectional view of the optical system of FIG. 2.
Figure 4:
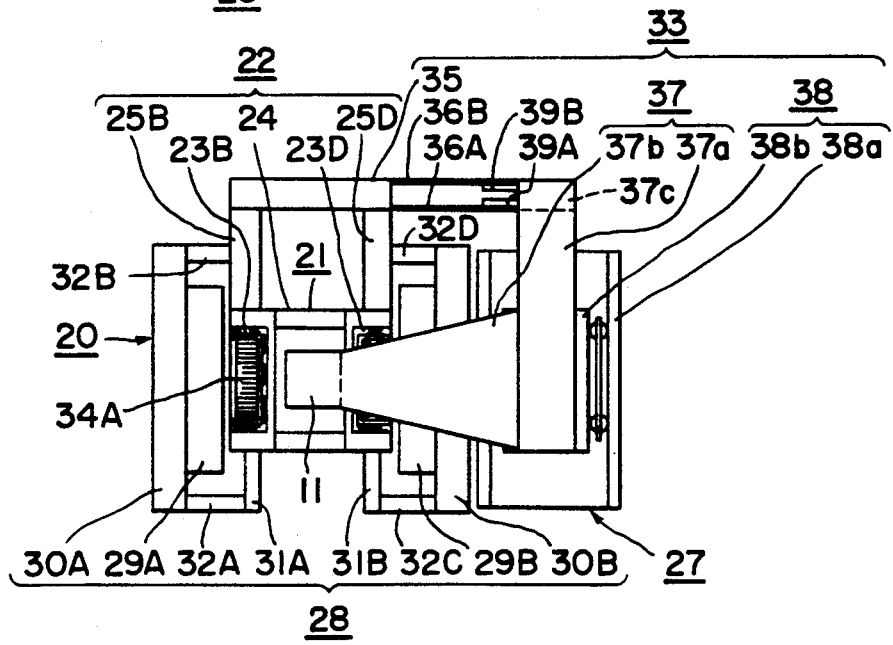
FIG. 4 is a bottom view of the optical system of FIG. 2.
Figure 5:
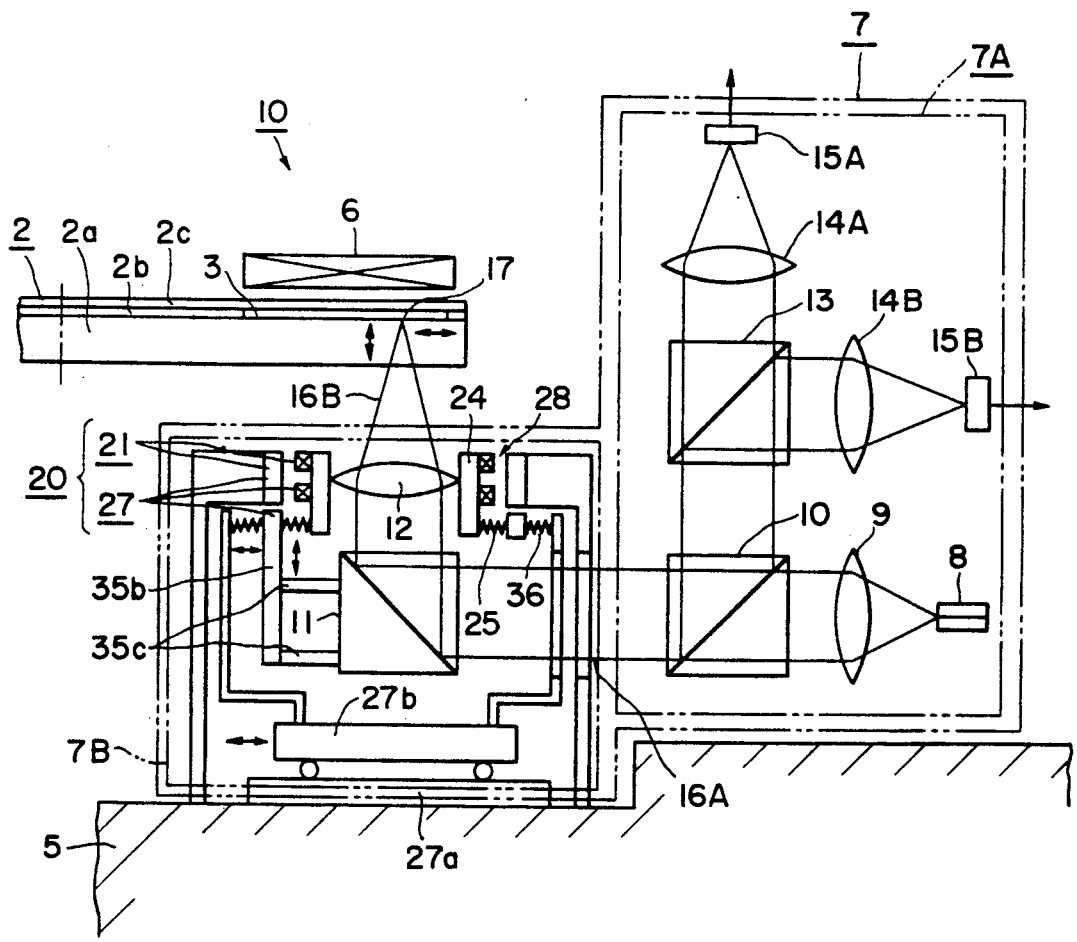
FIG. 5 is a view similar to FIG. 1 showing a second embodiment of the present invention.
Figure 6:
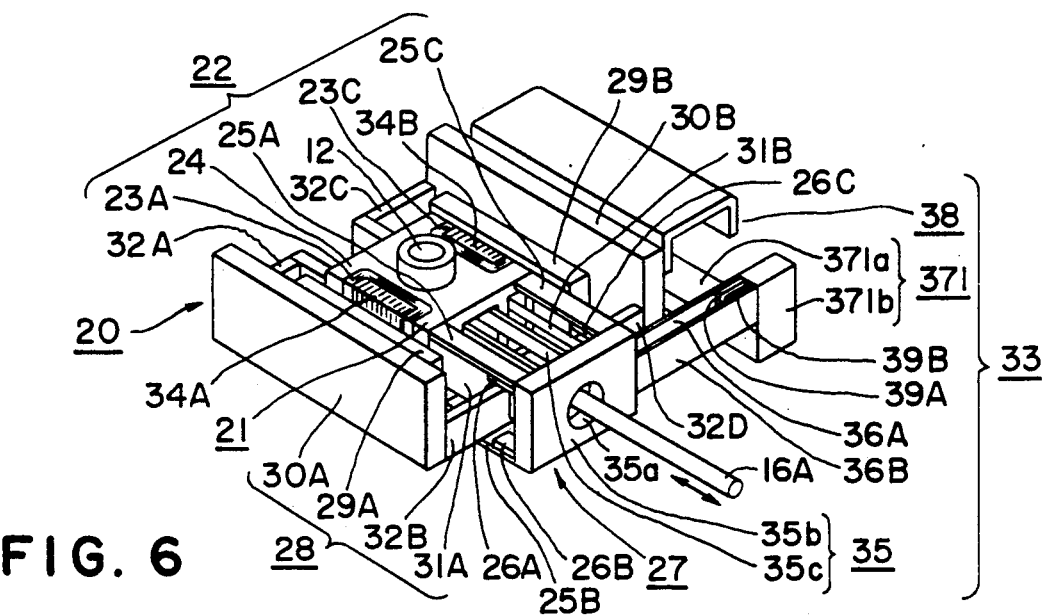
FIG. 6 is a perspective of the optical system of FIG. 5.
Figure 7:
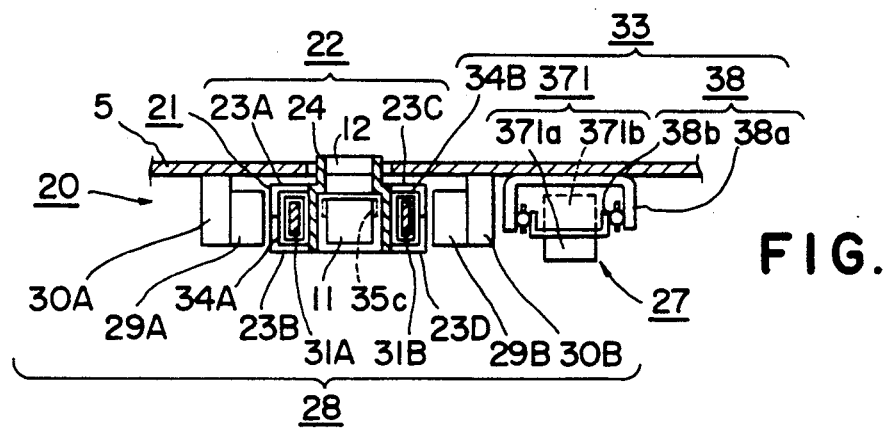
FIG. 7 is a cross-sectional view of the optical system of FIG. 6.
Figure 8:
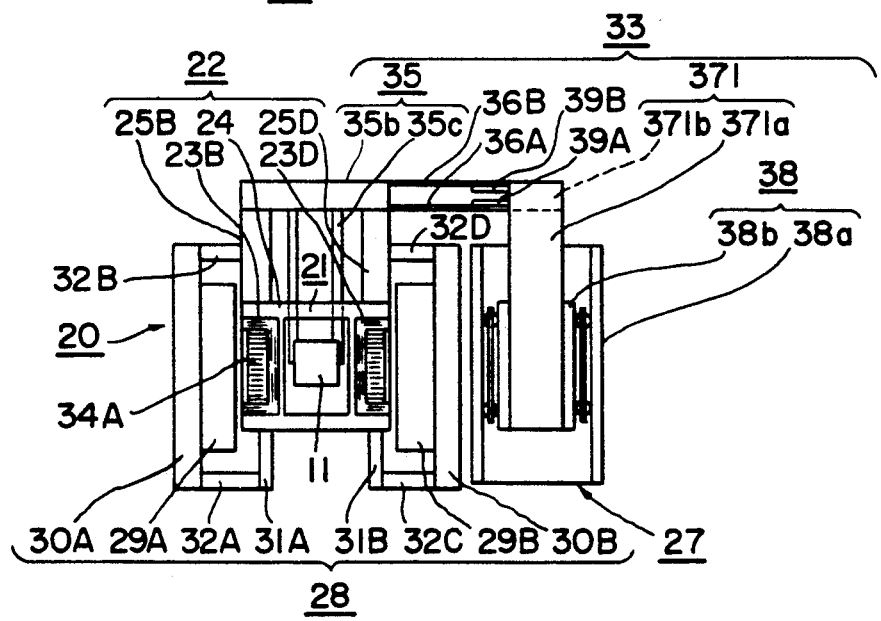
FIG. 8 is a bottom view of the optical system of FIG. 6.
Figure 9:
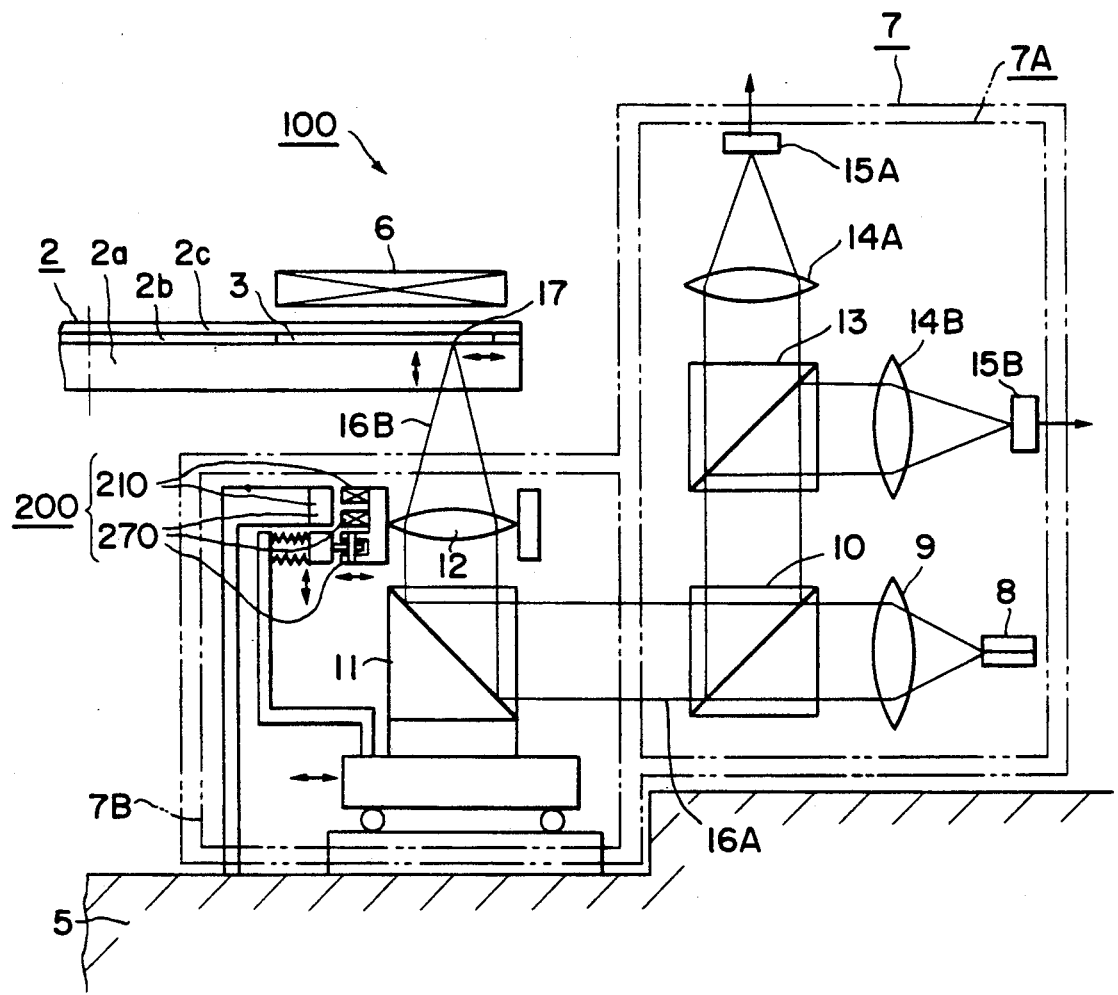
FIG. 9 is a view similar to FIG. 1 showing a third embodiment of the present invention.
Figure 10:
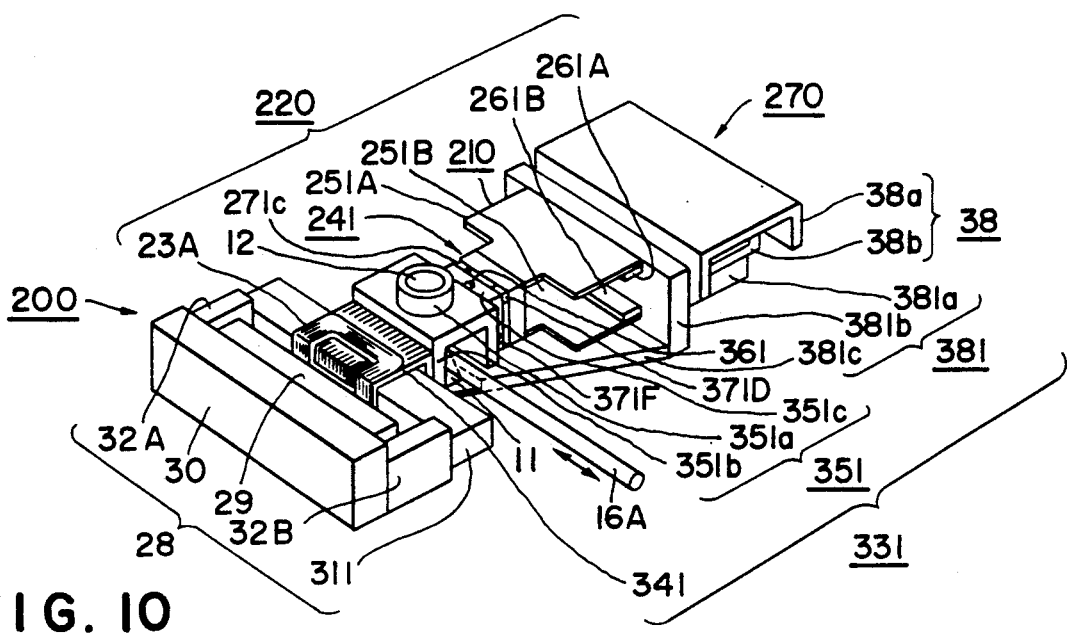
FIG. 10 is a perspective view of the optical system of FIG. 9.
Figure 11:
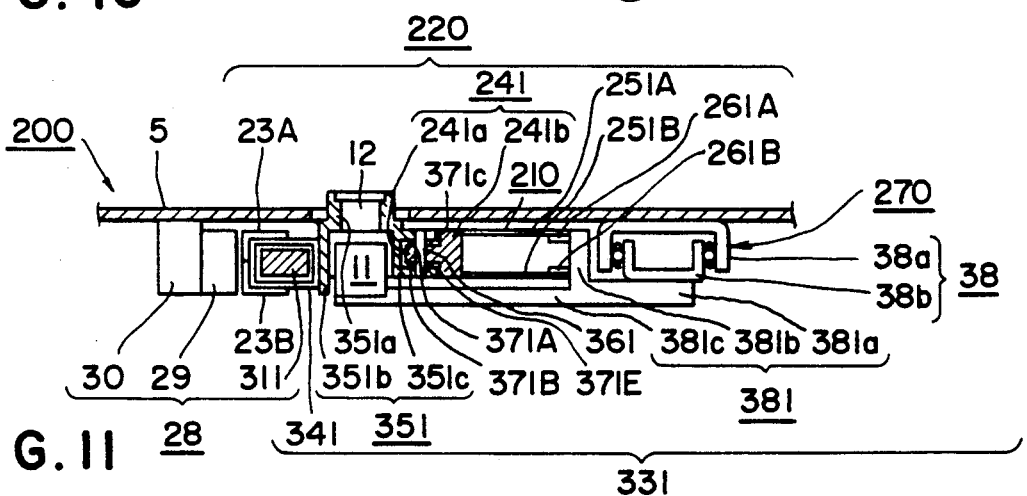
FIG. 11 is a cross-sectional view of the optical system of FIG. 9.
Figure 12:
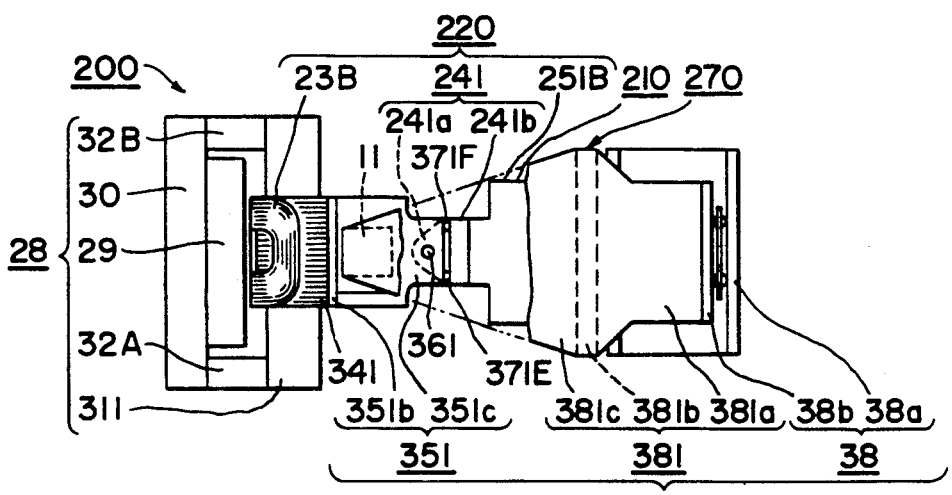
FIG. 12 is a bottom view of the optical system of FIG. 9.
Figure 13:
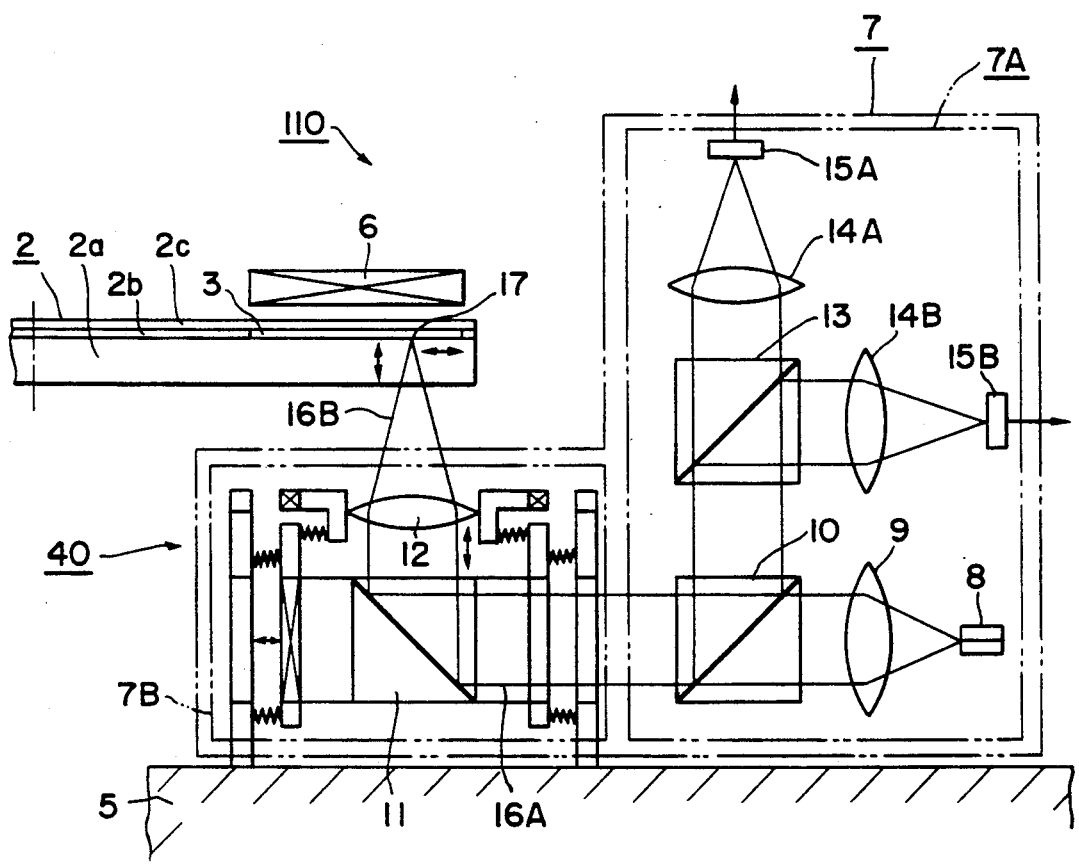
FIG. 13 is a view similar to FIG. 1 of a forth embodiment of the invention.

FIG. 2 through FIG. 4 are diagrams indicating a specific embodiment of the focus and tracking servo actuator 20.

As has been described, this focus and tracking servo actuator 20 is monolithically configured of a focus servo actuator 21 and a tracking servo actuator 27. The moving portions 22 and 33 of each move in conjunction with the fixed portion 28 common to both, and perform the focus servo operation and the tracking servo/feed operation described above.

This tracking servo actuator 27 is configured from rectangularly-shaped plate magnets 29A and 29B which are magnetized in the direction of their thickness, steel plate back yokes 30A and 30B, prism-shaped steel yokes 31A and 31B, steel spacers 32A, 32B, 32C and 32D, and the like.

The outer surfaces of the magnets 29A and 29B are respectively fixed to the inner surfaces of the back yokes 30A and 30B respectively fixed to the lower surface of the base 5, so that they are respectively parallel with respect to the light beams 16A, and on the left and right of the light beams 16A of the laser light from the fixed unit 7A of the optical unit 7 described above. The yokes 31A and 31B are respectively disposed so that there are gaps of a predetermined size between the ends of their outer surfaces, so as to be parallel to and maintain gaps of a predetermined size with respect to the inner surfaces of the magnets 29A and 29B, and are fixed to the inner end surface of the spacers 32A, 32B, 32C and 32D.

The spacers 32A, 32B, 32C and 32D have their outer end surfaces respectively fixed to both of the ends of the inner surfaces of the back yokes 30A and 30B.

The moving portion 33 is configured from two coils 34A and 34B that have prism-shaped hollow cores, an intermediate moving resin body 35 that is the shape of a rectangular plate, two leaf springs 36A and 36B, a moving resin spacer 37, and a linear ball bearing 38, and the like.

These coils 34A and 34B have gaps of a predetermined inner diameter at their centers, and these gaps have the yokes 31A and 31B passing through them respectively. Both of the end surfaces of the coils 34A and 34B, and their outer surfaces that face the inside are fixed to a coil holder 24 to be described later. The intermediate moving resin body 35 is disposed so that both of the end surfaces on the right side with respect to the light beams 16A from the fixed unit 7A are fixed to the movable ends of the leaf springs 36A and 36B. In addition, the round through hole 35a formed in the center portion is disposed so that the light beams 16A pass through it. This intermediate moving resin body 35 is linked to the leaf springs 25A, 25B, 25C and 25D by the coil holder 24 to be described later. In addition, the leaf springs 36A and 36B are disposed so as to be vertical and parallel at a predetermined distance to each other, and perpendicular to the direction of the light beams 16A.

The linear ball bearing 38 has its fixed portion fixed to the lower surface of the base 5 at a position on the outer side of the back yoke 30B and so that its movable portion 38b can slidably move parallel to the direction of the light beams 16A.

The moving portion base 37 is configured from a base portion 37a, an relay prism support portion 37b, and a leaf spring support portion 37c. The upper surface of this base portion 37a is fixed to the lower surface of the movable portion 38b of the linear ball bearing 38. In addition, the side of the fixed unit 7A extends for a predetermined length from the end surface of the fixed portion 38a of the linear ball bearing 38. Then, the leaf spring support portion 37c is formed perpendicular to the upper surface of this end portion that extends. The leaf springs 36A and 36B are respectively fixed to the surface on the inner side of this leaf spring support portion 37c. These leaf springs 36A and 36B, and the linear ball bearing 38 enable the intermediate moving resin body 35 and hence the coil holder 24 to move only in the direction of the light beams 16A and without contacting the fixed portion 28. In addition, the relay prism support portion 37b is disposed beneath the magnet 29B, the back yoke 30B and the coil 34B, and one end of it is formed as a single unit with a portion that overlaps the movable portion 38b of the linear ball bearing 38 on the surface of the inner side of the base portion 37a. To this distal end portion and corresponding to the light beams 16A is fixed the relay prism 11 that converts the optical axis of the light beams 16A into the perpendicular direction. This relay prism 11 is inserted at a predetermined distance into the cavity formed between the coil 34A and the coil 34B of the coil holder 24 described above.

The focus servo actuator 21 is configured from a moving portion 22 and a fixed portion 28. This moving portion 22 is configured from four L-shaped hollow coils 23A, 23B, 23C and 23D, a resin coil holder 24, and four leaf springs 25A, 25B, 25C and 25D.

These coils 23A, 23B, 23C and 23D are formed into an L-shape by bending them at right angles around the corners of the coils that have been wound around square-shaped hollow centers. These two coils 23A and 23B overlap and are fixed to the outer peripheries of the coil 34A of the tracking servo actuator 27 and the other two coils 23C and 23D overlap and are fixed to the outer periphery of the previously described coil 34B. This is to say that these coils 23A and 23B are disposed so that one side of each of the coils is respectively fixed to an upper surface and a lower surface of the side of the coil 34A, so that the other sides of each of the coils are respectively disposed so that there is a gap of predetermined size between the inner surface of the magnet 29A inside the cavity formed between the magnet 29A and the yoke 31A. These coils 23C and 23D are disposed so that one side of each of the coils is respectively fixed to the upper surface and the lower surface of the side of the coil 34B, and so that the other sides of each of the coils are respectively disposed so that there is a gap of predetermined size between the inner surface of the magnet 29B inside the cavity formed between the magnet 29B and the yoke 31B. Also, the distal ends of the outer peripheries that are other than the contact end surfaces of these coils 23A and 23B, and 23C and 23D are respectively fixed to the coil holder 24.

This coil holder 24 is formed as a single unit with the coil holder portion and a lens holder portion. This coil holder portion has the coils 23A, 23B, and 34A, and coils 23C, 23D and 34B fixed to it in the manner that has already been described, and its top surface is formed so that it is flush with the side surfaces of coils 23a and 23C, its bottom surface is flush with the bottom surfaces of coils 23B and 23D, its left side surface is flush with the left side surfaces of coils 23A and 23B, and its right side surface is flush with the right side surfaces of coils 23C and 23D. This lens holder portion protrudes in a cylindrical shape into the central portion of the coil holder portion, and to its inner periphery is fixed the objective lens 12 with its center positioned on the optical axis of the light beams that are converted into the perpendicular direction by the relay prism 11.

The movable ends of the leaf springs 25A, 25B, 25C and 25D are respectively fixed perpendicular to the end portions of the upper left and right and lower left and right corners f the end surface forming a side of the fixed unit 7A of the coil holder portion of the coil holder 24, with each of the fixed ends being fixed so that they are perpendicular to the upper and lower left and right portions of the surface of the side of the coil holder 24 of the intermediate moving resin body 35. These leaf springs 25A, 25B, 25C and 25D are disposed so as to be horizontal and mutually parallel with respect to the light beams 16A. By this, the coil holder 24 can be moved only in the direction of the optical path of the light beams converted to the perpendicular direction by the relay prism 11. Moreover, these leaf springs 25A, 25B, 25C and 25D, and the leaf springs 36A and 36B are for the damping of parasitic vibrations and so to each of them are respectively adhered the rubber damping members 26A, 26B, 26C and 26D (not indicated in the figure), and 39A and 39B.

Focus servo signals flow through the coils 23A and 23B, and coils 23C and 23D of the focus servo actuator 21 previously described. By this, each of the sides of the coils 23A and 23B, and the coils 23C and 23D that are respectively disposed within the magnetic field in the cavities between the magnet 29A and the yoke 31A, and the magnet 29B and the yoke 31B, receive a magnetic force and these coils 23A, 23B, and coils 23C and 23D move in the upwards and downwards direction because of the displacement of the leaf springs 25A, 25B, 25C and 25D. Accordingly, the objective lens 12 moves on the optical axis of the light beams that have been converted into the perpendicular direction by the relay prism 11, and the point of focus of the light spot 17 produced by the objective lens 12 is kept on the disc 2 and focus servo operation performed.

Tracking servo signals flow through the coils 34A and 34B of the tracking servo actuator 27. By this, the sides of the coils 34A and 34B respectively disposed in a magnetic field in the cavity between the magnet 29A and the yoke 31A, and the magnet 29B and the yoke 31B receive a magnetic force so that the coils 34A and 34B move in the longitudinal direction of the magnets 29A and 29B and the yokes 31A and 31B because of the displacement of the leaf springs 36A and 36B. Accordingly, the objective lens 12 moves in the direction of the light beams 16A, and the light spot moving in the direction of the diameter of the disc 2 performs the tracking servo operations. In the same manner, feed signals flow through these coils 34A and 34B so that the sliding of the movable portion 38b of the linear ball bearing 38 causes the relay prism 11 and the objective lens 12 to move in the direction of the light beams 16A, and the movement of the light spot 17 within the range from the inner diameter to the outer diameter of the recording area 3 of the disc 2 performs the feed operation.

Moreover, in order to improve the response of this feed operation and tracking operation, the spring characteristics of the leaf springs 36A and 36B and the internal load characteristics of the linear ball bearing 38 are adjusted to predetermined values.

In addition, in the description of one embodiment of the present invention, these leaf springs 36A and 36B were described as being disposed on the side of the fixed unit 7A in the direction of the tracking feed but it is also possible for them to be disposed on both sides of the coil holder 24. It is a matter of course that the present invention not be limited to this, and that the leaf springs for focus servo, the leaf springs for tracking servo, and the bearing apparatus for feed be capable of various types of design modification within the scope of the present invention.

The focus and tracking servo actuator 20 of one embodiment of the present invention and having the configuration described above directly drives the objective lens 12 without the coils 34A and 34B for tracking servo feed acting via the leaf springs for focus servo. In addition, the longitudinal direction of the leaf springs 25A, 25B, 25C and 25D for focus servo is disposed in alignment in the direction of the tracking servo feed. By this, it is possible to have superior response and control characteristics for the tracking servo operation and the feed operation without there being any secondary vibration. In addition, the tracking servo operation and the feed operation have an improved access speed because they are both performed by the tracking servo actuator 27 described above.

In addition, the tracking servo operation is performed by the displacement of the leaf springs 36A and 36B for tracking servo and the feed operation is also performed in the same manner for the range of displacement of these leaf springs 36A and 36B. Accordingly, the frequency of operation of the linear ball bearing 38 is reduced, the friction is also reduced, and the reliability improved.

Also, the linear motors 49a and 69a for the dedicated feed apparatus 49 and 69 for feed operation are no longer required, and the moving portion 33 which is the field magnet portion is used for both the focus servo actuator 21 and the tracking servo actuator 27 and so the magnetic disc apparatus 1 can be made more compact and the costs reduced.

In addition, when the leaf springs 36A and 36B for the tracking servo are disposed on the side of the fixed unit 7A of the coil holder 24, the distance from the center of rotation of the disc 2 to the focus and tracking servo actuator 20 can be made larger and so it is possible to use a flat, thin type of motor of large diameter for the spindle motor and this also makes it possible for the disc apparatus 1 to be made thinner and be manufactured at lower cost.

FIG. 5 through FIG. 8 indicate a second embodiment of the present invention. In a disc apparatus 10 according to this second embodiment, two parallel arms 35c are fixed to the inner surface of a leaf spring holder portion 35b, in the direction perpendicular to that surface. The other ends of these parallel arms 35c are fixed to both of the end portions of the relay prism 11.

In this manner, the relay prism 11 is held by the two parallel arms 35c so that it is not necessary to provide the relay prism support portion 37b that extends to the lower portion of the relay prism 11 as there was in the first embodiment. Because of this, the movable base 371 is configured from the base portion 371a and a leaf spring holder portion 371b. The base portion 371a has its upper surface fixed to the lower surface of the movable portion 38b of the linear ball bearing 38, in the same manner as for the first embodiment. In addition, the leaf spring holder portion 371b that supports the leaf springs 36A and 36B is provided so as to cross the end portion of the base portion 371a at right angels.

The other portions of the configuration are the same as those for the first embodiment, are indicated with the same numerals, and the corresponding description of them is omitted.

In this embodiment, the relay prism 11 is supported by the two parallel arms 35c and so it is possible for the center of the objective lens 12 to always be in agreement with the optical axis of the light beams 16A that have been converted to the perpendicular direction by the relay prism 11. By this, it is possible for the recording and reproducing operation of the optical recording and reproducing apparatus to be performed accurately.

FIG. 9 through FIG. 12 indicate a third embodiment of the present invention. In the disc apparatus 100 according to this embodiment, the tracking operation is performed by the displacement of the shaft and bearings for the tracking servo.

The moving portion 331 is configured from a coil 341 that has a prism-shaped hollow core, a resin lens holder 351, a shaft 361, ring-shaped rubber plate dampers 371A and 371B, square rubber dampers 371C, 371D, 371E and 371F, a resin movable base 381, and a linear ball bearing 38, and the like.

This coil 341 has a gap of a predetermined inner diameter at its center, and this gap has the steel-bar 311 passing through it. The outer surfaces of the coil 341 that face the inside are fixed to an outer-facing surface of a coil holder 351b of a lens holder 351.

This lens holder 351 is comprised as a single unit, with a coil holder portion 341b disposed to the left side of light beams 16A of laser light from the fixed unit 7A, a shaft holder portion 351c that is C-shaped in section across its center portion and disposed on the right side of these light beams 16A, and a cylindrical-shaped lens holder 351a that protrudes into the center portion of the upper surface of a portion linking the upper surfaces of the coil holder portion 351b and the shaft holder portion 351c. To an upper end of an inner periphery of this lens holder portion 351a is disposed an objective lens 12 so that its center is positioned on the optical path of the light beams that are converted to the perpendicular direction by the relay prism 11. In addition, to the center portions of the lower side portion and the upper side portion of the shaft holder portion 351c are fixed the upper and lower end portions of the shaft 361. This shaft 361 is supported so as to be freely rotatable by the bearings 241a of the bearing means 241 to be described later, and which is inserted in the cavity portion of the C-shaped bearing holder portion 351c.

The movable base 381, the base portion 381a, the leaf spring holder portion 381b and the relay prism holder portion 381c are configured as a single unit, and the upper surface of this base portion 381a is fixed to the lower surface of the movable portion 38b of the linear ball bearing 38. The leaf spring holder portion 381b is a plate that is disposed parallel to, and so as to maintain a predetermined gap with respect to an inner surface and an outer surface of the fixed portion 38, and so as to be perpendicular to the upper surface of the base portion 381a. To its inner surface is vertically fixed the fixed end of the leaf springs 251A and 251B for focus servo (to be described later) and which support both the previously described bearing means 241.

In addition, the relay prism holder 381c is disposed beneath the bearing body 241, the leaf spring 251B and the previously described base portion 381a. At the end of the relay prism holder 381c, the relay prism 11 is fixed so as to correspond to the light beams 16A of laser light from the fixed unit 7A.

On the other hand, the focus and tracking servo actuator 210 is configured from a moving portion 220 and a fixed portion 28. This moving portion 220 is configured from two coils 23A and 23B having L-shaped cores, a resin bearing means 241 and two leaf springs 251A and 251B, and the like.

The previously described bearing means 241 is formed as a single unit from the leaf spring holder portion 381b of the moving base 381 and a leaf spring holder portion 241b and a bearing portion 241a which protrudes vertically in the upper and lower directions of the central portion of the inner surface of this leaf spring holder portion 241b. To the upper and lower end portions of the end surface of this leaf spring holder portion 241b are perpendicularly fixed the moving ends of these leaf springs 251A and 251B. In the central portion of the bearing portion 241a are formed bearing holes that pierce in the upper and lower directions and these bearing holes engage with the shaft 361.

The leaf springs 251A and 251B are respectively disposed parallel to each other and the bearing means 241, and therefore the lens holder 351 are movable only in the direction of the optical axis of the light beams that have been converted to the vertical direction by the relay prism 11. Moreover, these leaf springs 25A and 25B are for the damping of parasitic vibrations and so to each of them are respectively adhered the rubber damping members 26A and 26B.

In addition, between the upper side portion and the lower side portion of the shaft holder portion 351c of the lens holder 351 and the bearing portion 241a are respectively inserted dampers 371A and 371B so as to stop the play in the up and down direction of the shaft holder portion 351c of the lens holder 351 and the bearing portion 241a. Also, between the four corners of the inner surface of the leaf spring holder portion 241b and both ends of the surfaces of the outer ends of the lower and upper sides of the C-shaped shaft holder portion 351c are respectively fixed dampers 371C, 371D, 371E and 371F. Accordingly, the rotational movement of the shaft 361 with respect to the bearing holes of the bearing portion 241a is small with respect to the amount of the damping of these dampers 371C, 371D, 371E and 371F. Then, in accordance with this fine rotational movement, the direction of movement of the objective lens 12 is regarded as the direction of the optical axis of the light beams 16A and hence there is no problem. The range of movement of the objective lens 12 in accordance with this rotational movement can be adjusted by the material, hardness and shape of the dampers 371C, 371E, 371E and 371F so that it corresponds to the tracking servo movement described above.

The other portions of the configuration are the same as those described for the disc apparatus 1 and the disc apparatus 10 of the fist and second embodiment, the corresponding portions are indicated with the same numerals, and the corresponding descriptions of them are omitted. These coils 23A and 23B move slightly in the up and down direction. Accordingly, the objective lens 12 moves on the optical axis of the light beams that have been converted into the perpendicular direction by the relay prism 11, and perform focus servo operation.

Also, the flow of tracking servo signals through the coil 341 of the tracking servo actuator 270 causes the coil 341 to move slightly in the longitudinal direction of the magnet 29 and the yoke 31 in accordance with the rotational movement of the shaft 36. Accordingly, the objective lens 12 moves int he direction of the optical axis of the light beams 16A and performs tracking servo operation. In the same manner, the flow of feed signals through this coil 341 moves the relay prism 11 and the objective lens 12 in the direction of the optical axis of the light beams 16A and performs the previously described feed operation.

According to the present embodiment, the leaf springs for tracking servo are not used and so the displacement of the objective lens 12 in the direction of tracking feed is performed by only the shaft 361 and the bearings 241 and so there is good controllability of the tracking servo operation. In addition, by this, the frequency of operation of the linear ball bearing 38 is reduced, and the amount of wear of the bearing is also reduced. Furthermore, the leaf springs 251A and 251B for focus servo have a wide width and so secondary vibration does not generate and the tracking servo operation and the feed operation have a good response and controllability.

FIG. 13 through FIG. 16 are diagrams indicating a fourth embodiment of the present invention. In the apparatus 110 according to the present embodiment, the coil for focus servo is divided into two parts left and right, and disposing a relay prism between these two coils enables the focus servo actuator to be made thinner. In addition, the relay prism holder portion has a cantilevered structure and the compactness and light weight of the moving portion is emphasized.

Figure 14:
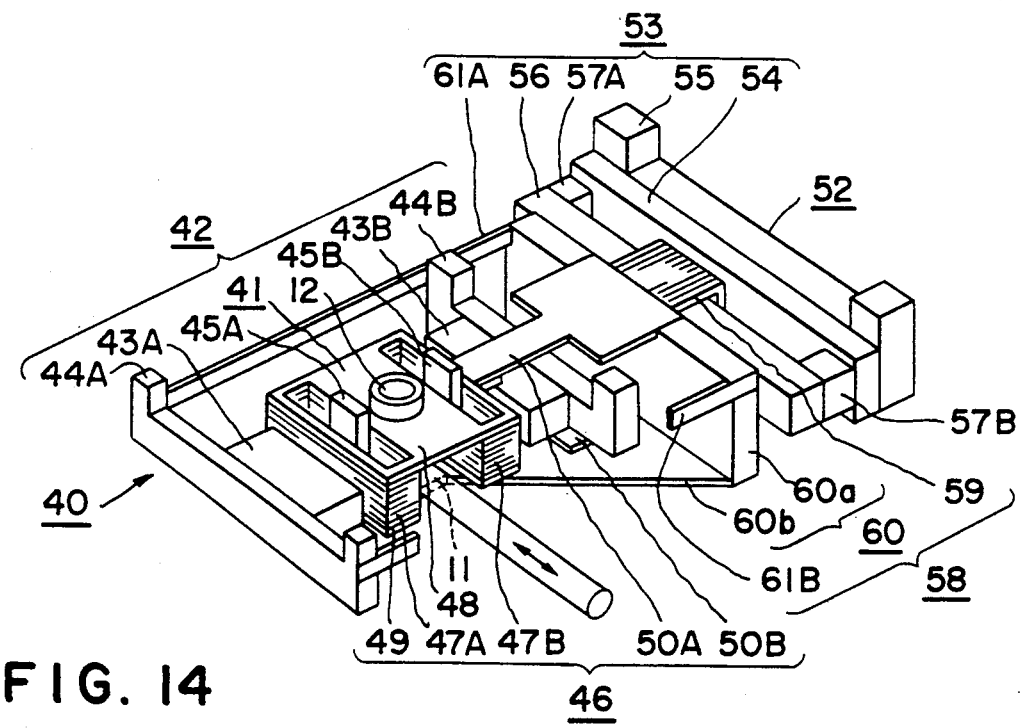
FIG. 14 is a perspective of the optical system of FIG. 14.
Figure 15:
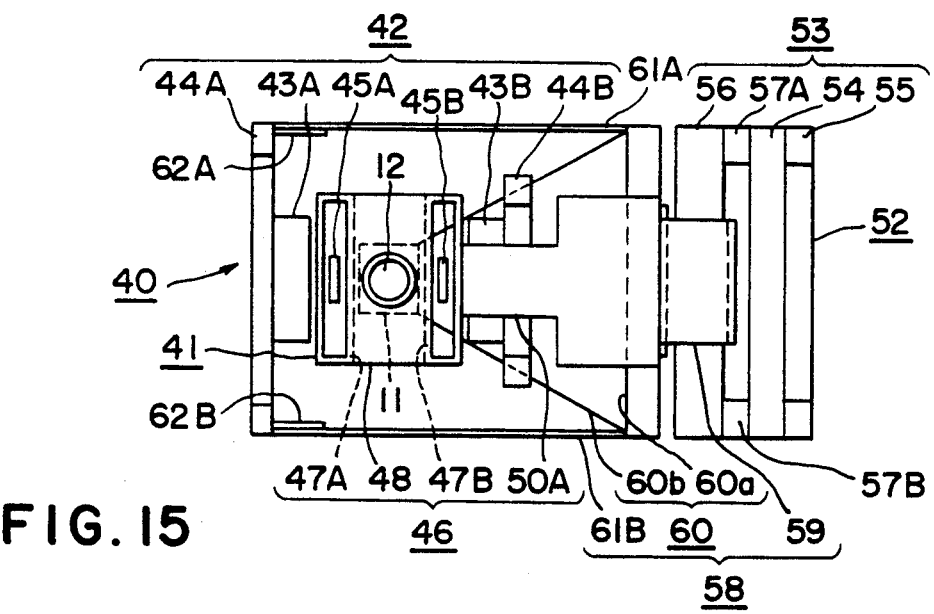
FIG. 15 is a bottom view of the optical system of FIG. 14.
Figure 16:
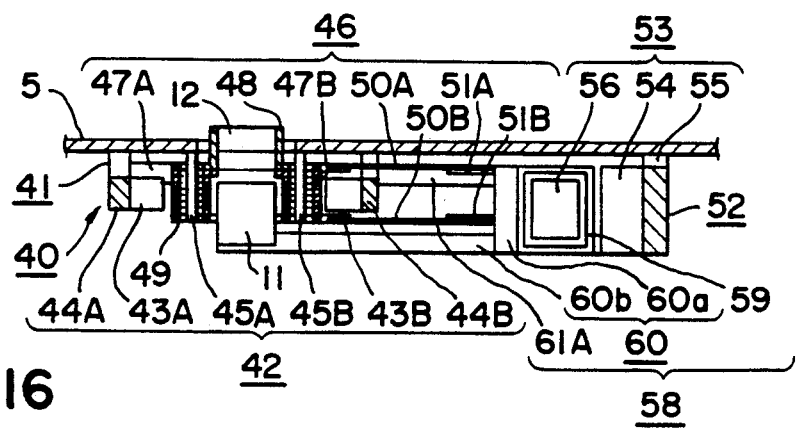
FIG. 16 is a cross-sectional view of the optical system of FIG. 14.

As indicated in FIG. 14 through FIG. 16, the focus and tracking servo actuator 40 according to the present embodiment is configured as a single unit from the focus servo actuator 41 and the tracking servo actuator 52.

This tracking servo actuator 52 is configured from a fixed portion 53 and a moving portion 58. This fixed portion 53 is configured from a rectangular plate-shaped magnet 54 which is magnetized in the direction of its thickness, a steel back-yoke 55, a prism-shaped steel yoke 56, and spacers 57 and 58, etc.

This prism-shaped steel yoke 56 is fitted at both ends via the spaces 57A and 57B so that one surface of it is parallel to and held at a predetermined distance from the magnetized surface of the plate-shaped magnet 54. The side opposing the yoke 56 and this magnet 54, and the side opposing this are fixed to the inner surface of the back-yoke 55. To the upper end surface of this back-yoke 55 is fixed the lower surface of the base 5 so that the long direction of the plate-shaped magnet 54 and the prism-shaped steel yoke 56 are parallel to the direction of the optical axis of the light beams from the fixed unit 7A of the optical unit 7.

This moving portion 58 is configured from a oil 59 that has a prism shaped core, a resin movable base 60, and left and right leaf springs 61A and 62B, etc.

This coil 59 is inserted into the yoke 56 so as to maintain a predetermined gap with the inner surface of the hollow portion. Then, the surface of the side of the coil that is on the opposite side to the coil side that opposes the magnetized surface of the plate-shaped magnet 54 is fixed to the central portion of the outer surface of the base 60a of the moving base 60 that is parallel to this magnetized surface. To a lower end of an inner surface of the base portion 60a of this moving base 60 is formed a prism holding portion 60b which is perpendicular to the base portion 60a and which forms a single unit with it. The lower side of this relay prism holding portion 60b has the same dimension as the width of the base portion 60a and the upper surface is flat, has the same depth as the relay prism 11, and has a constant plate thickness. To the distal end of this relay prism holding portion 60b is fixed an relay prism 11 that converts the optical path into the perpendicular direction, and so as to correspond to the optical path of the light beams from the fixed unit 7A. also, to the upper distal ends of both ends of the inner surface of the base portion 60a are perpendicularly fixed one end of the leaf springs 61A and 61B. The other ends of these leaf springs 61A and 61B are respectively perpendicularly fixed to each of the ends of the inner surface of the back yoke 44A to be described later. In the status where these left and right leaf springs 61A and 61B control the focus servo actuator 41, the moving portion 46 of the focus servo actuator 41 and the moving portion 58 are movable only in the direction of the optical axis of the light beams from the fixed unit 7A. Then, when there is such movement, the leaf springs 61A and 61B are disposed parallel to and at a predetermined distance from each other so that they do not contact the focus servo actuator 41.

The focus servo actuator 41 is configured from a fixed portion 42 and a moving portion 46. This moving portion 46 is configured from two coils 47A and 47B with hollow prism-shaped centers that are rectangular in section, a resin objective lens holder 48, a resin coil holder 49 and upper and lower leaf springs 50A and 50B, etc.

On the inner surface of the cylinder-shaped lens holder portion that protrudes into the center portion of this objective lens holder 48 is fixed the objective lens 12 with its center positioned on the optical path of the light beams that are converted into the perpendicular direction by the relay prism 11. To the right and left of the relay prism 11 that opposes the direction of the optical axis of the light beams from the fixed unit 7A are disposed coils 47A and 47B with the direction of the windings on the coil sides on their long sides wound so as to be parallel to the direction of the optical axis. The surfaces of the upper ends of these coils 47A and 47B are fixed to the lower surface of the right and left of the lens holder portion of the objective lens holder 48. Also, the surfaces of the lower ends of these coils 47A and 47B are fixed to the upper surfaces of the left and right of the coil holder 49 for reinforcing. The portions of the coil 47A and 47B of the coil holder 49 and the objective lens holder 48 that are fixed are respectively formed with holes in the longitudinal direction and having the same shape as the hollow center portions of the coils 47A and 47B. To the end surface of the side of the base portion 60a of the objective lens holder 48 and coil holder 49 are respectively and perpendicularly fixed one end of the leaf spring 50A and 50B. The other ends of these leaf springs 50A and 50B are respectively and perpendicularly fixed to the inner surface of this base 60a. In the status where these upper and lower leaf springs 50A and 50B control the back yoke 44B and the magnet 43 that is to be described later, and which are between them, the moving portion 46 is movable only in the direction of the optical axis of the light beams that have been converted into the perpendicular direction by the relay prism. 11. When there is this movement, the leaf springs 50a and 50B are disposed so as to be parallel to, and so as to maintain a predetermined distance to each other so as not to contact the magnet 53B and the back yoke 54B.

The fixed portion 42 is configured from a prism shaped magnets 43A and 43B and which are magnetized in the direction of the plate thickness, steel back yokes 44A and 44B, and rectangular, plate-shaped steel yokes 45A and 45B.

These yokes 45A and 45B are inserted into the center portions of the hollow portions of the hollow coils 47A and 47B, so that a gap of a predetermined size is maintained between the inner surfaces of the coil sides, and to the upper surfaces are respectively fixed the lower surface of the base 5. The magnetized surfaces of the magnets 43A and 43B are respectively disposed so as to oppose at a predetermined distance the surfaces of the coil side on the side opposite the relay prism 11. Also, the surfaces of the sides opposite the sides opposing these coils sides are respectively fixed to an inner surface of the back yokes 44A and 44B that have their upper surfaces respectively fixed to the lower surface of the base 5.

The other portions of the configuration are the same as those for the first embodiment, are indicated with the same numerals, and the corresponding description of them is omitted.

Also, the flow of tracking servo signals through the coil 59 of the tracking servo actuator 52 causes the coil 59 to move slightly in the longitudinal direction of the magnet 54 and the yoke 56 and perform tracking servo operation. In addition, the feed operation is also performed in the same manner by the tracking servo actuator 52.

Also, the flow of focus servo signals to the coils 47A and 47B of the focus servo actuator 41 moves these coils 47A and 47B in th downwards direction. Accordingly, the objective lens 12 moves in the direction of the optical axis of the light beams 16A that have been converted into the perpendicular direction by the relay prism 11, and the movement of the spot by the objective lens 12, in the direction of the plate thickness of the disc 2 performs the focus servo operation.

In order to dampen harmful vibration during the focus servo operation and the tracking servo operation, this leaf springs 50A, 50B and 61A and 61B of this focus servo actuator 41 and tracking servo actuator 52 have rubber damping members 51A, 51B, and 62A and 62B respectively adhered to them.

Moreover, in the focus and tracking servo actuator 40 of one embodiment according to the present invention, the tracking servo actuator 52 is used to perform both tracking servo operation and feed operation as has been described before but, it is also possible for it to perform only tracking servo operation and for the feed operation to be performed by a separately disposed feed apparatus.

Furthermore, the relay prism holding portion 60b of the moving base 60 was described using the example where there was a constant plate thickness but it is also possible to have plate thicknesses of various sizes in order to lighten the weight or improve the strength.

According to the present embodiment, it is possible to have the relay prism 11 disposed between the left and right coils 47A and 47B, and realize a compact optical recording and reproducing apparatus. In addition, the relay prism holding portion 60b has a cantilevered structure that enables the moving base portion 60 to be compact and lightweight.

We claim:

1. An optical system drive apparatus for an optical recording/reproducing apparatus that irradiates laser light emitted from a light-emitting diode to an opto-magnetic disk via a relay prism and an objective lens, and irradiates light reflected by said opto-magnetic disk to a light-receiving diode, comprising:
   a third moving portion movable in a direction of tracking feed of said disc, said third moving portion being fixed to a movable portion of a linear ball bearing movable in the direction of tracking feed and being connected to said relay prism;
   a second moving portion movable in the direction of tracking feed, said second moving portion being connected to said third moving portion by a leaf spring and supporting an arm connected to said relay prism;
   a first moving portion for holding the objective lens and coil means, said first moving portion being connected to said second moving portion and displaceable in the direction perpendicular to said direction of tracking feed and said coil means being operable for tracking feed and focussing feed; and
   a fixed portion for holding magnets supported thereon, said fixed portion being fixed to a base means and said magnets facing said coil means and extending in said direction of tracking feed.

2. An optical system drive apparatus for an optical recording/reproducing apparatus that irradiates laser light emitted from a light-emitting diode to an opto-magnetic disk via a relay prism and an objective lens, and irradiates light reflected by said opto-magnetic disk to a light-receiving diode, comprising:
   a third moving portion movable in a direction of tracking feed of said disc, said third moving portion being fixed to a movable portion of a linear ball bearing movable in the direction of tracking feed;
   a second moving portion connected to said third moving portion by a first leaf spring, said second moving portion being displaceable in the direction perpendicular to said direction of tracking feed;
   a first moving portion for holding the objective lens and coil means operable for tracking feed and focussing feed, said first moving portion being connected to said second moving portion by a connecting means comprising a shaft and bearing linked to be displaceable in said direction of tracking feed so that said second moving portion is rotatable and displaceable in the direction perpendicular to said direction of tracking feed; and
   a fixed portion for holding magnets supported thereon, said fixed portion being fixed to a base means and said magnets facing said coil means.

3. An apparatus as claimed in claim 2, wherein: said connecting means further comprises leaf springs.

* * * * *